(12) United States Patent
Hel

(10) Patent No.: US 7,398,728 B2
(45) Date of Patent: Jul. 15, 2008

(54) BALING PRESS

(75) Inventor: Sebastien Hel, Ancier (FR)

(73) Assignee: Deere & Company, Moline, IL (US)

( * ) Notice: Subject to any disclaimer, the term of this patent is extended or adjusted under 35 U.S.C. 154(b) by 226 days.

(21) Appl. No.: 11/099,948

(22) Filed: Apr. 6, 2005

(65) Prior Publication Data

US 2005/0235841 A1 Oct. 27, 2005

(30) Foreign Application Priority Data

Apr. 21, 2004 (DE) ........................ 10 2004 019 286

(51) Int. Cl.
*B30B 15/26* (2006.01)
*B30B 15/30* (2006.01)
*A01D 39/00* (2006.01)

(52) U.S. Cl. .............................. 100/45; 100/49; 56/341

(58) Field of Classification Search .................... 100/4, 100/43, 45, 48, 49, 50, 99, 100, 215; 56/10.2 R, 56/10.2 A, 10.2 G, 14.7, 341, 10.2 C, 343, 56/432, 433

See application file for complete search history.

(56) References Cited

U.S. PATENT DOCUMENTS 4,627,341 A * 12/1986 Sudbrack et al. .............. 100/41
5,253,570 A * 10/1993 Goeckner ..................... 100/41
2002/0112617 A1* 8/2002 Leupe et al. ................... 100/4
2002/0174781 A1* 11/2002 Leupe et al. .................. 100/88

FOREIGN PATENT DOCUMENTS

| DE | 43 12 991 | 10/1994 |
| DE | 690 24 082 | 5/1996 |
| DE | 197 15 280 | 10/1998 |
| DE | 198 31 506 | 1/2000 |
| DE | 600 16 841 | 5/2005 |
| EP | 0 223 351 | 5/1987 |
| EP | 0 655 190 | 5/1995 |

OTHER PUBLICATIONS

German Search Report, Jul. 10, 2007, 3 Pages.

* cited by examiner

*Primary Examiner*—Jimmy T Nguyen

(57) ABSTRACT

A baling press having a rectangular pressing space in which a pressing piston is movably disposed. The pressing space includes a crop material inlet in which the crop material to be pressed enters the pressing space from the feed channel. The material is pre-pressed in the pressing space by a compressing fork before it is forcefully inserted into the pressing space by a loading fork. The baling press further includes a sensor system which determines at least one value which represents the vertical distribution of the material and/or the vertical distribution of the density of said material, in the pressing space.

10 Claims, 3 Drawing Sheets

BALING PRESS

TECHNICAL FIELD

The invention relates generally to agricultural bales, in particular to a baling press for measuring and controlling compressed crop material.

BACKGROUND

Various methods have been contemplated for controlling the overall consistency of compressed cropped material. For example, in European Patent EP 2,223,351 B1 to Strosser filed on May 9, 1986, entitled to "Electronic Device for Measuring and Controlling the Compacting of Crop Material," discloses an agricultural baling machine used to control the density of bales of crop material discharged as well monitor the stress experience by a reciprocally driven plunger assembly employed to apply a compactive force to crop material in a bale case. The Strosser reference further discloses a baling press with a pressing piston which is reciprocally movable in a pressing space by means of two vertically separated driving rods, which piston is connected to the driving rods via piston pins which are equipped with shear stress sensors. The baling press in this reference also has means of adjusting the pressure established in the pressing space by an associated mechanism, based on a value determined by the shear stress sensors.

Currently, there is a need for a baling press to provide optimal homogeneity in the bale produced by such a baling press on a consistent basis. To solve this problem, the present invention may be used. The present invention provides for a baling press having a rectangular pressing space in which a pressing piston is movably accommodated, and having a feed channel with a feed mechanism for compression of materials in the feed channel. Additionally, the feed channel conveys the compressed crop material into the pressing space, to enable production of homogeneous bales, particularly large rectangular bales. A sensor system is provided which can determine at least one value which represents the vertical distribution of the material in the pressing space (with respect to altitude in the pressing space).

The baling press can produce bales which are homogeneous in the vertical direction and have a substantially uniform density, because the sensor system determines at least one value which represents the vertical distribution of material and/or vertical variation of bale density, and by utilizing this value the baling press or components thereof (and the towing vehicle etc.) can be adjusted to produce the desired result. Such a baling press can be utilized in an industry to produce rectangular bales comprised of materials such as paper, textiles, or waste materials, or any other suitable materials. Preferably, however, the baling press is used for agricultural applications, particularly for producing large rectangular bales. The baling press may be towed by a towing vehicle or may be self-propelled.

The sensor system may optionally comprise at least two sensors, each of which determines a respective value, wherewith the difference between the sensor values is an indicator of the distribution of material. It is conceivable to provide several sensors, e.g. if it is desired to have a detailed indication of the distribution of material. The sensor system may comprise only a single sensor, e.g. configured to determine a vertical distribution of pressure on the pressing piston. An indicator can be generated from at least one sensor which is configured to evaluate a moment, e.g. in the pressing piston and/or in one or more guide means interacting with the piston, or in a drive means of the pressing piston. Such a determination of a moment by a suitable sensor allows one to make conclusions concerning the vertical distribution of the crop material in the pressing space.

From the point values determined by the sensors one has a difference representing the distribution of material when there is a separation between the sensors at least in the vertical direction. The sensors may also be separated in the horizontal direction in order to determine the distribution of material in the transverse (width) direction of the baling press.

If the sensors are disposed in a region of the pressing space which is directed toward the pressing piston, the distribution of material is determined in the region to which material was last added, so that the determined value represents a quite recent status. For example, the sensors in the sensor system may be disposed in the pressing space on the walls of the pressing space, or may be disposed on or in the pressing piston, or may interact directly or indirectly with the piston. Such arrangements also yield a determined value which represents a quite recent status of the machine.

The sensor may be in the form of pressure sensors. The pressure sensors may be disposed on a wall, or on two or more walls, of the pressing space, or on the ceiling floor of the pressing space. In the alternative, the pressure sensors may also be disposed on the pressing piston, particularly on the side thereof which is directed toward the material being pressed by the piston, so as to interact directly with the material being pressed. At least one sensor may be in the form of a length sensor, which may be disposed, in the pressing space on a wall of the pressing space, so as to determine movement of the material with respect to the pressing space (or with respect to the respective wall(s)). For this purpose, one may employ star wheel devices also known as finger wheel devices of a known type. Other mechanical or optical sensors, or any other suitable sensors, may be employed.

The sensor may interact directly or indirectly with the pressing piston, it may be disposed on or in the piston itself or on or in the drive means for the piston, in the alternative, the sensor may be disposed in one or more guide means which guide the piston, e.g. with respect to the pressing space, or in suitable fastening and connecting devices. The sensor may comprise or be a component of the device on or in which it is disposed. A suitable fastening or connecting device may, connect the pressing piston to a rod which drives the pressing piston or connects the piston to drive means, which rod may be or may comprise a device in the nature of a driving rod or connecting rod.

The sensor may be in the form of a force-measuring rod, which joins two or more components and determines the forces which occur at a given connecting location, the sensor may be a moment sensor, which determines a moment exerted directly or indirectly on an appropriate component. The sensor is disposed in the pressing piston, it may connect the pressing piston with, a rod, connecting rod, drive rod, or the like, wherewith preferably it may determine the stresses (particularly shear stresses) on the connection at a particular location, during a pressing stroke of the pressing piston. If a guide means has a sensor (independently of or supplementary to the sensor disposed in the pressing piston), that sensor may determine, a stress (a shear stress) or a moment acting on this guide means.

The sensor may be in the form of a strain-measuring or expansion-measuring strip. Such a strain-measuring or expansion-measuring strip may be disposed, on the pressing piston itself or on a rod connecting the piston to a drive means, or on a link rod, control lever, driving rod, or any other component which is suitable for determining a stress representing the vertical distribution of the material in the pressing space.

Conceivably, different types of sensors can be combined. Preferably, however, the sensors are of the same type, so that the sensor system will determine at least one stress difference, force difference, pressure difference, length difference, a moment or moment distribution, which directly or indirectly represents the distribution of the material in the pressing space.

The feed mechanism, by means of a feeding implement, such as a rake-like or pitchfork-like element, pre-presses the material, preferably in a pre-pressing chamber or feed channel, and conveys the material into the pressing space. Ordinarily, the feeding mechanism further includes a compressing fork which pre-presses the material, preferably in the feed channel, and a loading fork which loading fork conveys the pre-pressed material into the pressing space proper. Such an arrangement makes it possible, particularly with independent control of the two forks, to influence the compression of the material in the feed channel as a function of the value determined by the sensor system. This may occur by compressing the material more strongly in one region than in another if the sensor system in the region of the pressing space has indicated insufficient density or insufficient material distribution in said first region and in the material being charged there by the loading fork. For the design an operation of a baling press suitable for this purpose, reference may be made to another German patent application number 103 43 386.4, dated Sep. 19, 2003, entitled "Baling Press and Method", which is incorporated herein by reference, in its entirety.

It may be provided that the value is displayed to the operating individual by means of a video display device disposed on or in the baling press or on or in the towing vehicle, or is otherwise displayed, this enables the operator to adjust the baling press or to make an evaluation following an operating cycle. Direct means of influencing or controlling the baling press may be provided, by transmitting the value to a control device, preferably electrical or electronic, which is disposed on the baling press or on a towing vehicle which is connected to or connectable to the baling press, the control device then processes and utilizes said value.

It may be provided that the control device controls or regulates functions of the baling press and of the towing vehicle, specifically the speed of travel and direction of travel. In particular it is possible that the control device controls or regulates the feed mechanism or a movement of the loading fork of the compressing fork, depending on the value. In this connection, reference is again made to the German patent application number 102 43 386.4, which discloses a suitable baling press and a corresponding method of operation of such a baling press.

It is conceivable to influence the pressing space, a bale-pressing device in the pressing space, a speed of travel of the baling press or of a corresponding towing vehicle, the operation of the pressing piston, or other appropriate functions of the baling press or towing vehicle, depending on the value. If it is possible to change or set the volumetric content of the feed channel or the quantity of the pre-pressed material which will be conveyed into the pressing space by the loading fork, depending on the value, this capability can be exploited to compensate for non-uniform distribution of material, particularly over the altitude of the baling press. It is conceivable that such an adjustment of the feed channel and the volume may be made by an operating individual depending on the displayed value of the value or depending on a difference of such values over time. It is possible to make such adjustments automatically and thereby rapidly, by means of the electrical or electronic control device. In particular with the use of such a control device or with human-intermediated control, the adjustment can be made by causing the value determined by the feed mechanism and/or the sensor to approach a predetermined or predeterminable set-point value. Such a set-point value may be fixed or may vary depending on the material being pressed, the environmental conditions, the requirements, etc. The set-point value may be predetermined or may be established automatically. The density of material in the feed channel can be affected by setting or influencing a means of ascertaining the density of the material in the feed channel. Such a means may comprise a spring-loaded flap or grid which forms a region of the wall of the feed channel or which extends into said channel, the operation of such flap means may be influenced by adjusting the action of the spring or of another spring means or adjusting the position of such flap means with respect to the feed channel, and the values provided by said flap means may be appropriately processed by the control device, which may provide appropriate control of the feed mechanism.

It may further be provided that the feed channel has at least one movable wall, which is preferably swingable. The swinging or other adjustment of the wall may be employed to influence the volume of the feed channel, which may already have variations between its inlet region and exit region which can be larger or smaller inlet or exit region. In one embodiment, the wall can move around a central region wherein a non-central region is enlarged and another non-central region is constricted a single swinging of the wall to adjust to a difference in values determined by the sensor system.

It is possible to influence the volume of the feed channel, particularly the volume of the amount or portion of material which will be conveyed into the pressing space by the loading fork, if the entry position of the loading fork in the feed channel with respect to the longitudinal extent of said channel can be changed. Thus it may be provided that the entry location of the loading fork can be individually set for each loading stroke, or that a cyclical setting of the loading fork is set up depending on an average of several values. If the loading fork is inserted in the feed channel at a location which is closer to the material inlet than is a reference position, the amount or portion of material conveyed to the pressing space in the next loading stroke is smaller when the loading fork is inserted at a location farther from said material inlet; and vice versa.

Alternatively or additionally, it may be provided that the loading fork can be held in at least one position in which it at least substantially closes off the material inlet to the pressing space and in which it blocks a stream of material moving toward said material inlet. In this manner, the volume of the feed channel can be defined by the loading fork, whereby the amount of material in the feed channel and/or the compression density and the distribution of material or the distribution of the density of the material in the feed channel can be set and controlled. In this connection, the loading fork may be the sole means of closing off the material inlet. Also, in addition to or independently of the loading fork a retention device may be provided in the form of a retaining fork, per se known, which can be used to selectively close off said material inlet.

It may be provided that the loading fork can be positioned only at certain predetermined positions. In order to enable adjustment of the feed channel or the volume of material or the density of material or the distribution of material in the feed channel, the position with respect to the longitudinal extent of the feed channel can be settable or variable. The loading fork may be inserted at a location directly adjoining the material inlet, and at one or more positions in the feed channel which are at various distances from said material inlet.

The position and setting of the loading fork can be set by mechanical means, such as rods, linkages, levers, crank drives, etc., or by hydraulic means, such as hydraulic motors, or by other suitable mean or devices. In order to achieve the most accurate positioning, at least one sensor may be provided which determines the position and setting of the loading fork and preferably transmits such information to the control device.

BRIEF DESCRIPTION OF THE DRAWINGS

Two exemplary embodiments are illustrated in the drawings and are described in more detail herein below.

DETAILED DESCRIPTION OF THE DRAWINGS AND THE PRESENTLY PREFERRED EMBODIMENTS

Figure 1:
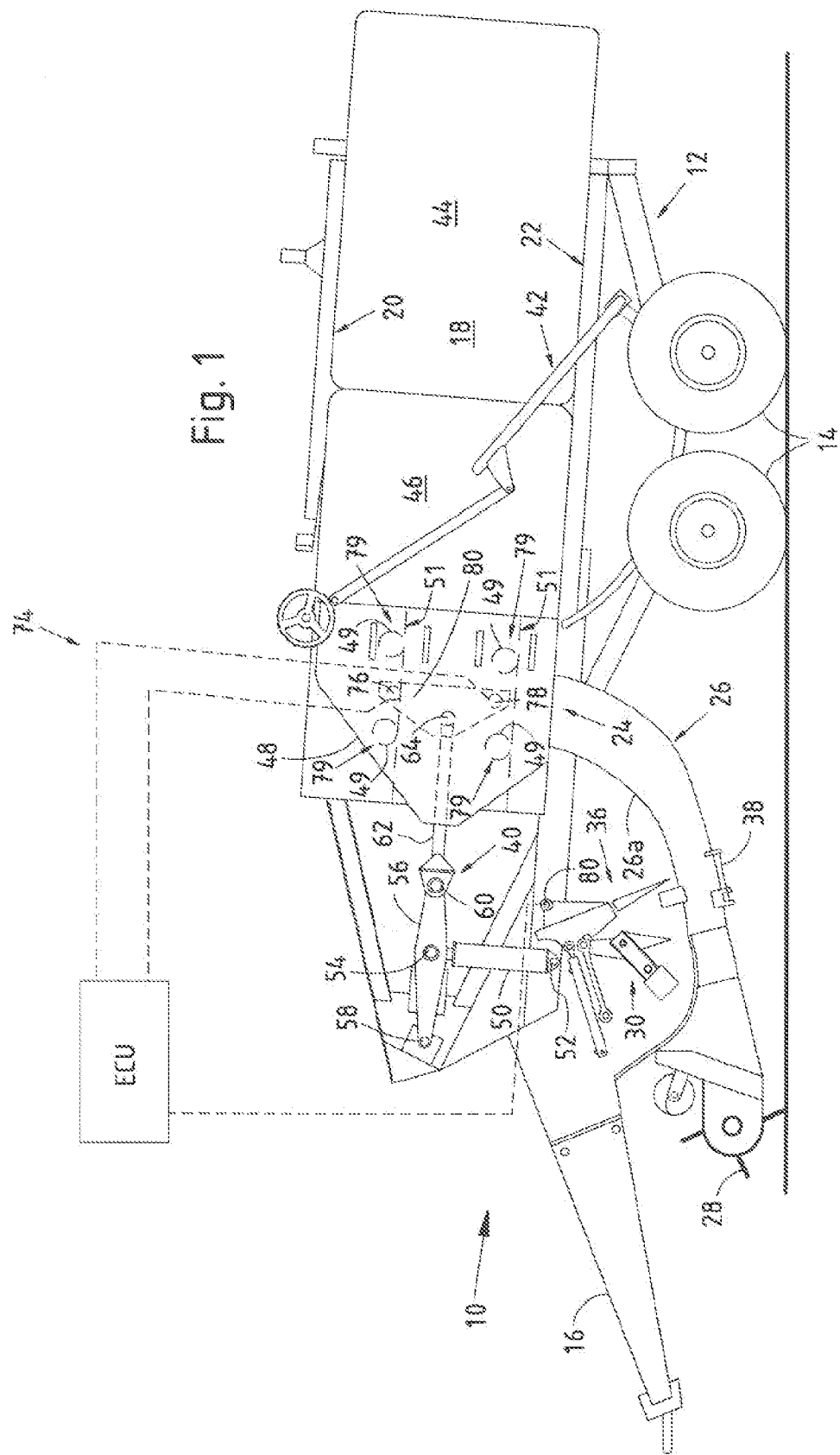
FIG. 1 illustrates a schematic view of a first embodiment of the baling press.

FIG. 1 illustrates a large baling press 10 intended to produce a rectangular bale. The press has a frame 12 which is supported on ground support wheels 14 in a tandem arrangement. A tow shaft 16 is connected to and extends forward from the frame 12, which tow shaft is configured to be connectable to a towing vehicle which has a power takeoff shaft to deliver power for driving various driven components of the baling press 10. A pressing space 18 or chamber of rectangular cross section is formed partially by a housing upper part 20 and a housing lower part 22.

The housing lower part 22 is provided with a material inlet 24 to which a curved feed channel 26 is connected which serves as a pre-pressing space, as will be discussed further. A pick-up device 28 which works in conjunction with a screw which conveys material toward the center is disposed ahead of the feed channel 26, and serves to raise a swath of crop material from the ground and deliver it to a compressing fork 30 which in turn serves to compress the crop material in the feed channel 26, until a load having prescribed density has been accumulated in the feed channel 26, and said charge is forcefully inserted into the pressing space 18 via the material inlet 24, by means of a loading fork assembly 36.

A spring-loaded flap or other means 38 is swingably mounted on a forward lower location of the feed channel 26, wherewith depending on the crop material present in the feed channel 26 said flap swings and reveals that a desired material density has been reached in said channel 26, which results in actuation of an electrical control circuit which establishes the corresponding drive connections to activate the loading fork assembly 36 so that it can move the charge of crop material into the pressing space 18. Further description of the functioning of the loading fork assembly 36 will be provided herein below.

When the charge of crop material has been inserted into the pressing space 18, a piston mechanism 40 disposed ahead of the frame 12 is actuated in a controlled sequence after the loading fork assembly 36 has been operated, so as to move the crop material rearward in the pressing space 18, where it is compressed into a compressed state, as is well known in the state of the art.

After the compressed aggregation of crop material has reached a predetermined length, a needle assembly 42 comprising a plurality of curved needles, for providing binding twine, is actuated, in order to feed a plurality of strands of twine to a corresponding number of knot-forming devices whereby lengths of twine are installed around the predetermined length of compressed crop material, to yield a bale 44 which is ready to unload. Unloading occurs when the bale 44 is pushed out of the rearward end region of the pressing space 18 by a bale part 46 which increases in length due to forcing of new charges of crop material into the pressing space 18.

Regarding the features of the piston mechanism 40, it should be noted that said mechanism is comprised of a pressing piston 48 configured for reciprocal movement in the pressing space 18 between a retracted position ahead of the material inlet 24 and an extended position beyond the material inlet 24 (as illustrated in FIG. 1). This movement of the pressing piston 48 has the result that charges of crop material which are introduced from the feed channel 26 into the pressing space 18 are compressed against an aggregation of crop material comprising a partially formed bale part 46 and a completed bale mass 44.

The pressing piston 48 has a plurality of rotatable guide means 49 which cooperate with corresponding guides 51 in the pressing space 18 whereby the pressing piston 48 is guided in the pressing space 18 with the aim of achieving uniform movement of the pressing piston 48 with low wear. The guides 51 illustrated in particular are schematically represented. The guide means 49 here are in the form of rolls extending transversely to the direction of movement of the pressing piston 48. The number of guide means 49 may be greater or less than that illustrated; and they may be in the form of rolls, wheels, spheres, sliding bearings, or other suitable means. Additionally, or alternatively, the guide means 49 may guide the pressing piston 48 transversely to its direction of movement, or may guide it in some other fashion, diagonally. In a variance from the arrangement illustrated, the guide means 49 may be disposed in a central region of the pressing piston 48 in one or more vertically and/or horizontally separated rows.

The piston mechanism 40 also comprises a drive 50 in the form of a reciprocal actuating device, which is illustrated here in the form of a double-acting hydraulic piston and cylinder unit the cylinder end of which is swingably anchored to a pin 52 on the frame 12 at a location above the compressing fork 30. The piston end of the drive 50 is connected to a linking location 54, by means of a pin, between the opposite ends of a first link rod 56 which serves as a crank arm. The forward end of link rod 56 is swingably mounted on the frame 12 at a pivot location 58. A rearward end region of the first link rod 56 is connected to the forward end region of a second link rod 62, at a pivot location 60, by means of a pin. The second link rod 62 functions as a pure connecting rod; its rearward end region is connected to the pressing piston 48 at a pivot location 64. It is noted that the connecting pins of the pivots 58 and 64 are disposed on a line of centers which is disposed along or approximately along the longitudinal middle axis of the pressing space 18. As a result, the reaction force of the crop material against the pressing piston 48 is essentially transmitted to the drive 50 when the first link rod 56 and second link rod 62 are disposed along a line, as occurs when the pressing piston 48 is in its rearward end position. It is also noted that the two link rods 56, 62 may each be realized as a pair of link rods disposed a distance apart in the transverse direction. The drive 50 would then be connected at the connecting location 54 disposed between the pair of link rods which together form the first link rod 56. It is further noted that the pressing piston 48 comprises the slider element of a slider and crank mechanism which comprises as a crank arm the first link rod 56 and as a pure connecting rod the second link rod 62. Although the linkage system comprised of the link rods 56 and 62 does not move out beyond a dead center point position, it may be designated as a "toggle joint mechanism" or "toggle linkage". In a second embodiment, the drive 50 may be connected at any location between the pivot point 58 and the pivot point 64. In yet another embodiment, the drive could be connected to the pivot 60 or at a point along the length of the second link rod 62. The device would operate in a superior manner wherein the driving element is connected directly to the pressing piston 48. Additional details of the baling press 10 are described in European Patent 0,940,072 A2, the disclosure of which is incorporated herein by reference. It is noted that an ordinary crank drive could be substituted for the special drive with a hydraulic motor which is described in that reference.

Figure 2:
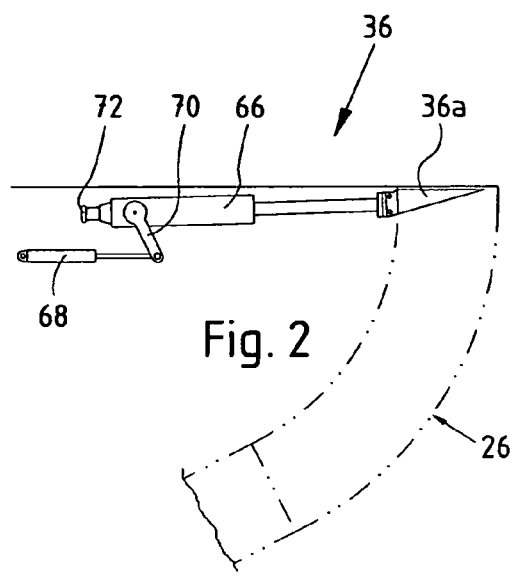
FIG. 2 is an enlarged view of a feed channel of the baling press, with a loading fork in a first position.
Figure 4:
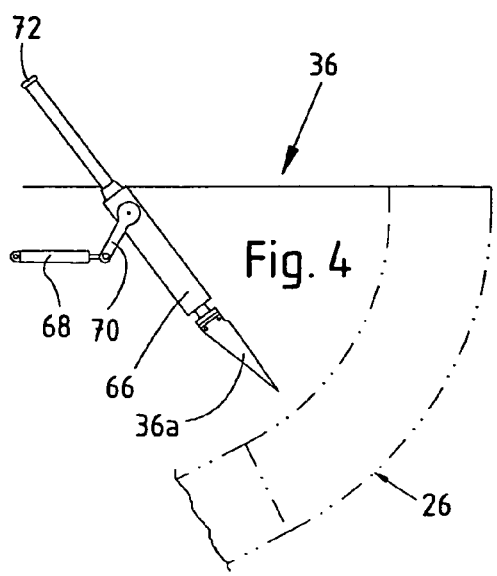
FIG. 4 is an enlarged view of a feed channel of the baling press, with a loading fork in a third position.
Figure 3:
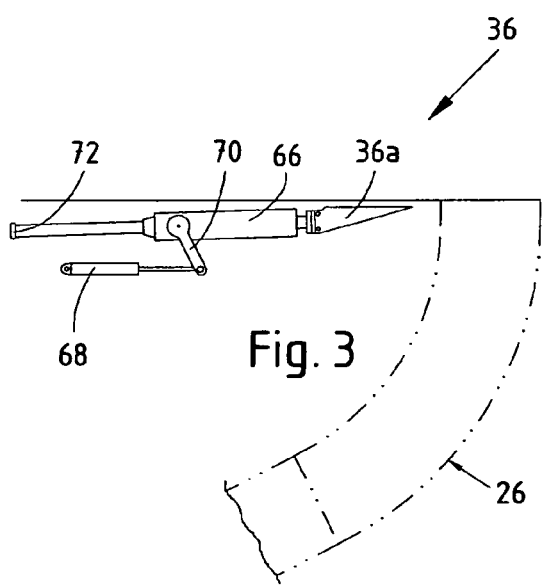
FIG. 3 is an enlarged view of a feed channel of the baling press, with a loading fork in a second position.
Figure 5:
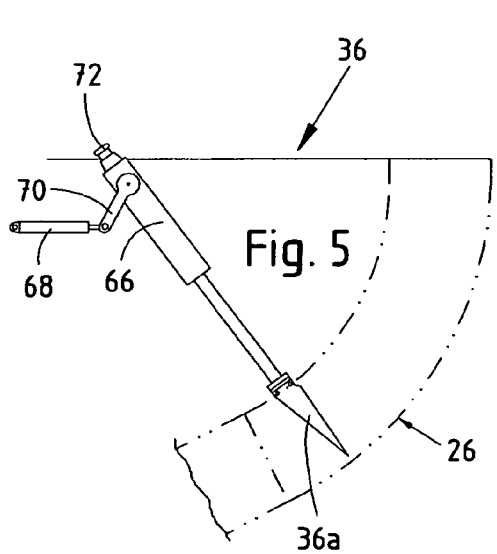
FIG. 5 is an enlarged view of a feed channel of the baling press, with a loading fork in a fourth position.

FIG. 2 in the present document, the feed channel 26 with the loading fork assembly 36 is shown in a first position, in an enlarged view. The loading fork assembly 36 has a loading fork 36*a*, a first motor 66 (which may be a hydraulic motor) can move the loading fork 36*a* in the longitudinal direction, and a second motor 68 (which may also be a hydraulic motor) which is connected to the first motor 66 by a lever 70 such that the first motor 66 can be swung around a pivot point 72 by extension or retraction of the motor 68. In FIGS. 3-5, the loading fork assembly 36 is shown in various positions.

As further shown, in FIG. 2, the loading fork assembly 36 is shown in its initial position.

The second motor 68 is extended, whereby the first motor 66 is held via the lever 70 in a position in which it is oriented approximately parallel to the housing lower part 22. The loading fork 36*a* is extended and, as an extension of the first motor 66, is disposed in an upper position which is at least approximately parallel to the housing lower part 22 and is disposed ahead of the material inlet 24. Because in this position the loading fork 36*a* essentially closes off the material inlet 24, the compressing fork 30 can compress the crop material which has been introduced into the feed channel 26.

When it is determined, by the means 38 for determining the compression density in the feed channel, that a certain density has been reached, a control means of the baling press 10 controls the first motor 66 such that said motor assumes its retracted position, whereby the loading fork 36*a* is withdrawn from the feed channel 26, and the material inlet opening is opened, as shown in FIG. 3.

Then the first motor 66 is swung by the second motor 68 into the position shown in FIG. 4 and the loading fork is moved into a position upstream of the material inlet 24, as shown in FIG. 5. Here the motor 66 has been extended, whereby the loading fork 36*a* is again operative in the feed channel 26.

The second motor 68 is then extended again, causing the first motor 66 to swing and the loading fork 36*a* to be moved along a curved path in the feed channel, back into the position illustrated in FIG. 2. In this process the loading fork 36*a* conveys the crop material contained in the feed channel to the pressing space 18 and forces it into said space. The material inlet is now closed off, and the next pre-pressing process can begin.

It may be provided that instead of the motors 66, 68 bringing the loading fork 36*a* into the position shown in FIG. 5 when a prescribed compression density is reached, they bring said loading fork 36*a* into a position in the feed channel 26 between the initial position as shown in FIG. 2 and the position shown in FIG. 5 when a prescribed compression density is reached, or when a prescribed time has elapsed, or when a certain number of cycles of the compressing fork 30 have occurred; and this intermediate position may be maintained. This constitutes an independent invention, independent of the above-described features.

It may also be provided that the loading fork 36*a* may be moved into and held in two or more positions in the feed channel 26, whereby the loading fork 36*a* divides the feed channel, such that first the compressing fork compresses the crop material against the loading fork 36*a* while the loading fork is in its first position, and then compresses the crop material against the loading fork while the loading fork is in its second position. This facilitates achievement of a uniform density of the crop material over the entire length of the feed channel 26, wherewith at the conclusion the material conveyed into the pressing space 18 by the loading fork 36*a* has improved homogeneity, and the bale produced by the baling press 10 has improved density.

It may further be provided that the loading fork 36*a* when it is reintroduced into the feed channel 26 is moved slightly farther along the feed channel 26 in the direction of the material inlet 24 by means of the second motor 68, in order to further compress the material. It is noted that the present invention can also be employed in a baling press which does not have a loading fork assembly 36 such as described or another known type of loading fork assembly which is mechanically drivable, or drivable by other means, or which is hydraulically drivable or otherwise drivable.

Referring back to FIG. 1, the baling press 10 has a sensor system 74 which has two vertically separated sensors 76, 78, which in the embodiment illustrated are force-measuring rods which connect the pressing piston 48 with a bracket 80 and which connect the bracket to the link rod 62 at the pivot location 64. The values determined by the sensors 76, 78 are in the nature of shear stresses, or in general they are the values of stresses which the pressing piston 48, particularly during a pressing stroke, exerts on or transmits to the force-measuring rods or other sensors 76, 78 which serve as a connection between the pressing piston 48 and the bracket 80 which bracket connects the link rod 62 to the pressing piston.

The values determined are indicators of the distribution of material and the density of the bale part 46 in the pressing space. If both sensors 76, 78 deliver approximately equal values, this indicates that the material is evenly distributed in the pressing space 48 because said material exerts an evenly distributed force on the pressing piston 48, and thus the pressed part 46 has an at least generally uniform density.

In one embodiment, the upper sensor 76 determines a lower value than the lower sensor 78, one may conclude that there is a lesser amount of material in the upper region of the pressing space 18, and the bale part 46 has a lower density in this region than in the lower region. If the lower sensor 78 determines a lower value than the upper sensor 76, there is a lesser amount of material in the lower region of the pressing space 18 and the bale part 46 in said lower region has a lower density. The difference in the determined values thus is an indication of the vertical distribution of materials in the pressing space 18 and thus the vertical distribution of the density of the bale part 46 being formed.

Alternatively or additionally, sensors 79 may be provided which are associated with or incorporated in the guide means 49, these sensors 79 may be coordinated with or may comprise components of the sensor system 74. Depending on the configuration of the guide means 49, the sensors 79 may be in the form of stress-measuring rods, or moment-measuring devices, or other suitable devices.

If the sensors 79 are in the form of stress-measuring rods, they may determine the load on said rods with regard to the guides 51, and, as indicated supra, they may determine a stress difference or load difference or moment which occurs, which provides an indicator of the vertical distribution of the crop material in the pressing space 18. If at least one of the sensors 79 is suitable for determining a moment, then one sensor alone may suffice to provide an indication of the vertical distribution of the crop material. This is particularly advantageous if the guide means 49 are disposed in a central position if the vertical distance between the guide means 49 or the sensors 79 is small or zero.

Figure 6:
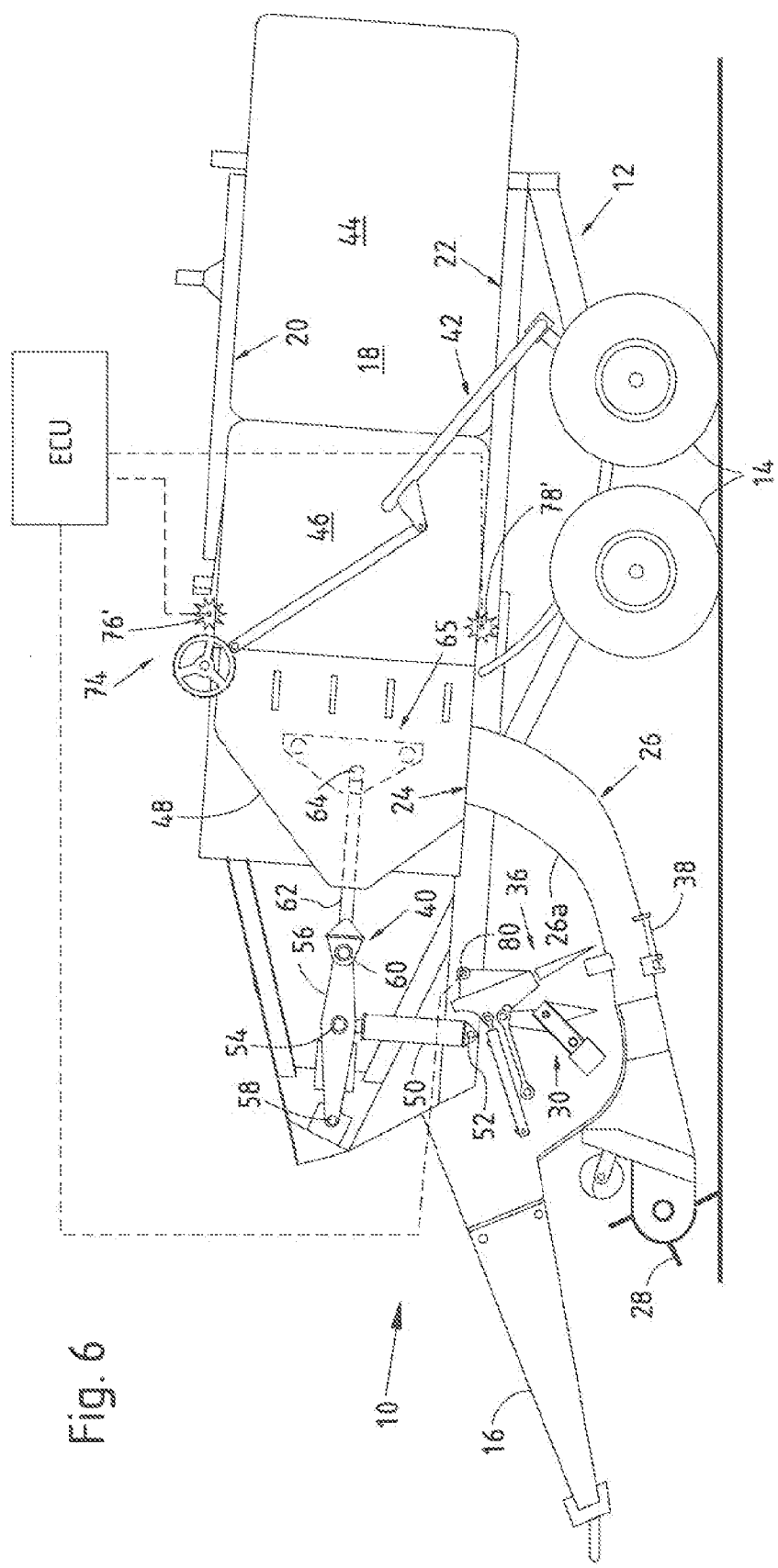
FIG. 6 is a second embodiment of a baling press.

FIG. 6 illustrates a second embodiment of the present invention. Here two sensors 76', 78' are provided which are separated in the vertical direction. The sensors 76', 78' according to this second exemplary embodiment are in the form of star wheels. Such star wheels are generally known for measurement of bale length, wherewith typically one star wheel is provided on an upper side or a lower side of the pressing space 18 to determine the movement of the bale in the longitudinal direction of the pressing space 18.

According to the present invention, two sensors 76', 78' in the form of star wheels are provided, which enables determination of a difference in the bale movement or a difference in bale length. Again, this difference is an indicator of the vertical distribution of material in the pressing space 18, and an indicator of the vertical distribution of density of the bale part 46.

If the upper sensor 76' determines a lesser value, i.e. if the upper star wheel 76' rotates to a lesser extent than the lower star wheel and sensor 78', for the reason that the bale part 46 moves a lesser distance in its upper region with respect to the longitudinal extent of the pressing space 18 as a consequence of a pressing stroke of the pressing piston 48, this indicates that there is less material in the upper region of the pressing space 18, and the bale part 46 in this region has a lesser density than in the lower region. In contrast, if the lower sensor 78' delivers a lower value than the upper sensor 76', there is less material in the lower region of the pressing space 18 and that the ball part 46 has a lesser density. The difference in the determined values is thus an indication of the vertical distribution of material in the pressing space 18 and thus an indication of the vertical distribution of the density of the bale part 46 being formed.

The values determined by the sensors 76, 78; 76', 78', 79 are transmitted to the control device, so that the baling press 10 can be appropriately controlled by said control device. In particular, the control device can be employed to influence the pre-pressing of the material in the feed channel 26 so as to at least partially compensate for non-uniform distribution of the material in the pressing space 18 and non-uniform density of the bale part 46 in the pressing space 18, via the next portion of material which is conveyed by the loading fork 36a into the pressing space 18. This result can be achieved by having the compressing fork 30 compress the crop material in an appropriate region of the feed channel 26 to a greater or lesser extent than in the rest of the feed channel 26.

In this connection, it is advantageous if the above-described control of the loading fork 36a is adapted such that the feed channel 26 is divided into sections, enabling a section-by-section compression of the crop material, wherewith there will be appreciable variations in the pre-pressing of the material in the feed channel 26.

Variations of the distribution of the material are also achievable by other means than those just described. The volume of the contents of the feed channel 26 may be changed, so that the volume conveyed by the loading fork 36a into the pressing space 18 through the material inlet 24 can be varied depending on the value(s) determined by the sensor system 74 and/or the sensors 76, 78, 76', 78', 79.

In addition, a wall 26a or a plurality of walls or wall segments of the feed channel 26 can be movable with respect to the rest of the feed channel 26. Further, the wall 26a may be swingable in one of its end regions or in a central region, so as to be able to increase or decrease the volume of the feed channel 26 as a whole, or, increase the volume of a first segment and decrease the volume of a second segment.

Also, depending on the aforesaid values, the volume of the pre-pressed material which is introduced into the pressing space 18 by the loading fork 36a can be varied by varying the entry position of the loading fork 36a at the beginning of a loading movement, to different positions in the feed channel, wherewith only a part of the material present in the feed channel 26 is conveyed through the inlet opening 24 and into the pressing space 18, or all of such material is so conveyed.

Additionally, as already described, it is possible for the loading fork 36a to be placed in a position in which it substantially or entirely blocks the material inlet 24. If this position is variable with respect to the longitudinal extent of the feed channel 26 or with respect to the flow of material in the feed channel 26, one can influence the amount and the compression of the portion of material which is to be introduced into the pressing space 18.

It is therefore intended that the foregoing detailed description be regarded as illustrative rather than limiting, and that it be understood that it is the following claims, including all equivalents, that are intended to define the spirit and scope of this invention.

What is claimed is:

1. A baling press for compressed crop materials that can be used with a tow vehicle, comprising:
   a rectangular pressing space;
   a pressing piston movably communicated to said pressing space, said pressing piston having a plurality of rotatable guide means which cooperate with corresponding guides in the pressing space;
   a plurality of stress measuring sensors are associated with the plurality of rotatable guide means;
   a feed channel having a feed mechanism for compression of crop materials in said feed channel and for conveying said compressed crop material into said pressing space; and
   a sensor system determining at least one value corresponding to a vertical distribution of compressed crop material in said pressing space said sensor system comprising first and second sensors, said first and second sensors being mutually separated in substantially a vertical direction, and wherein said plurality of stress measuring sensors are coordinated with the sensor system.

2. The baling press of claim 1 wherein said sensor system is disposed in a region of said pressing space adjacent to said pressing piston.

3. The baling press of claim 1 wherein said sensor system is disposed on said pressing piston.

4. The baling press of claim 1, wherein said first and second sensors are pressure sensors.

5. The baling press of claim 1 wherein the feed mechanism further comprises a loading fork or a compressing fork.

6. The baling press of claim 1 further comprising a control device, said control device regulating at least one function of said baling press.

7. The baling press of claim 1 wherein said feed channel has at least one movable wall.

8. The baling press of claim 5 wherein said loading fork is insertable in said feed channel along a longitudinal axis of said feed channel.

9. The baling press of claim 5 wherein said loading fork further comprising at least one position that substantially closes off a material inlet.

10. A baling press for compressing crop materials, comprising:
    a. a rectangular pressing space;
    b. a pressing piston in communication with said regular pressing space, said pressing piston having a plurality of rotatable guide means which cooperate with corresponding guides in the pressing space, a plurality of stress measuring sensors are associated with the plurality of rotatable guide means;
    c. a feed channel having a feed mechanism for compression crop materials, said feed mechanism further comprising a loading fork and a compressing fork in said feed channel;
    d. a sensor system determining at least one value corresponding to a vertical distribution of compressed crop material in said pressing space, said sensor system having first and second sensors, said first and second sensors are mutually separated in substantially a vertical direction wherein said first sensor is disposed about said pressing space, and wherein said plurality of stress measuring sensors are coordinated with the sensor system.

* * * * *